United States Patent [19]
Yeo et al.

[11] Patent Number: 5,821,945
[45] Date of Patent: Oct. 13, 1998

[54] METHOD AND APPARATUS FOR VIDEO BROWSING BASED ON CONTENT AND STRUCTURE

[75] Inventors: Boon-Lock Yeo; Minerva M. Yeung; Wayne Wolf; Bede Liu, all of Princeton, N.J.

[73] Assignee: The Trustees of Princeton University, Princeton, N.J.

[21] Appl. No.: 856,899

[22] Filed: May 15, 1997

Related U.S. Application Data

[63] Continuation of Ser. No. 328,877, Feb. 3, 1995, Pat. No. 5,708,767.

[51] Int. Cl.$^6$ .................................................. G06T 11/00
[52] U.S. Cl. ............................................................ 345/440
[58] Field of Search .................................... 345/440, 302, 345/473–475, 326, 327, 328, 348–350, 356, 357; 382/226; 348/391

[56] References Cited

U.S. PATENT DOCUMENTS

| | | | |
|---|---|---|---|
| 5,231,487 | 7/1993 | Hurley et al. ............................ | 348/391 |
| 5,329,596 | 7/1994 | Sakou et al. ............................. | 382/226 |
| 5,521,841 | 5/1996 | Arman et al. ............................ | 345/328 |
| 5,708,767 | 1/1998 | Yeo et al. ................................ | 345/440 |

OTHER PUBLICATIONS

B. Liu, W. Wolf, S. Kulkarni, A. Wolfe, H. Kobayashi, F. Greenstein, I. Fuschs, A. Hsu, F. Arman, and Y. Liang, "The Princeton video library of polities", *in Proceeding, Digital Libraries '94*, pp. 215–216, Texas A&M University, 1994.

S. Gauch, R. Aust, J. Evans, J. Gauch, G. Minden, D. Niehaus, and J. Roberts, "The digital video library system: Vision and design", *in Proceedings, Digital Libraries '94*, pp. 47–52, Texas A&M University, 1994.

H.J. Zhang, A. Kankanhalli, and S.W. Smoliar, "Automatic partitioning of full–motion video", *Multimedia Systems*, vol. 1 pp. 10–28, Jul. 1993.

F. Arman, A. Hsu, and M.Y. Chiu, "Image processing on compressed data for large video databases", *in Proceedings of First ACM International Conference on Multimedia*, pp. 267–272, Aug. 1993.

B.L. Yeo and B. Liu, "Rapid scene analysis on compressed videos", submitted to *IEEE Transactions on Circuits and Systems for Video Technology*, (Unpublished).

F. Arman, R. Depommier, A. Hsu, and M.Y. Chiu, "Content–based browsing of video sequences", *in ACM Multimedia 94*, pp. 97–103, Aug. 1994.

D. Swanberg, C.F. Shu, and R. Jain, "Knowledge guided parsing in video databases", *in Storage and Retrieval for Image and Video Databases*, vol. SPIE 1908, pp. 13–25, 1993.

S.W. Smoliar and H.J. Zhang, "Content–based video indexing and retrieval", *IEEE Multimedia*, pp. 62–72,1994.

(List continued on next page.)

*Primary Examiner*—Almis A. Jankus
*Attorney, Agent, or Firm*—Watov & Kipnes, P.C.

[57] ABSTRACT

A new technique for extracting a hierarchical decomposition of a complex video selection for browsing purposes, combines visual and temporal information to capture the important relations within a scene and between scenes in a video, thus allowing the analysis of the underlying story structure with no a priori knowledge of the content. A general model of hierarchical scene transition graph is applied to an implementation for browsing. Video shots are first identified and a collection of key frames is used to represent each video segment. These collections are then classified according to gross visual information. A platform is built on which the video is presented as directed graphs to the user, with each category of video shots represented by a node and each edge denoting a temporal relationship between categories. The analysis and processing of video is carried out directly on the compressed videos. Preliminary tests show that the narrative structure of a video selection can be effectively captured using this technique.

16 Claims, 13 Drawing Sheets

OTHER PUBLICATIONS

M.J. Swain and D.H. Ballard, "Color indexing", *International Journal of Computer Vision*, vol. 7, pp. 11–32, 1991.

N.K. Hu, "Visual pattern recognition by moment invariants", *IRE Transactions on Information Theory*, pp. 179–187, 1962.

A.K. Jain and R. C. Dubes, *Algorithms for Clustering Data*, Prentice Hall, pp. 71–89, 1988.

László Szirmay–Kalos, "Dynamic layout algorithm to display general graphs", in Paul Heckbert, editor, *Graphics Gems IV*, pp. 505–517. Academic Press, Boston, 1994.

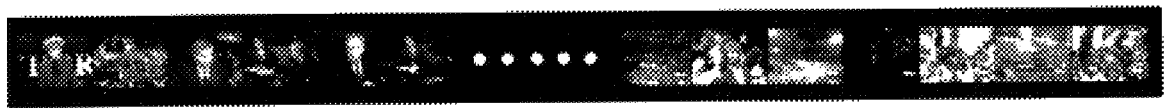
F I G. 2

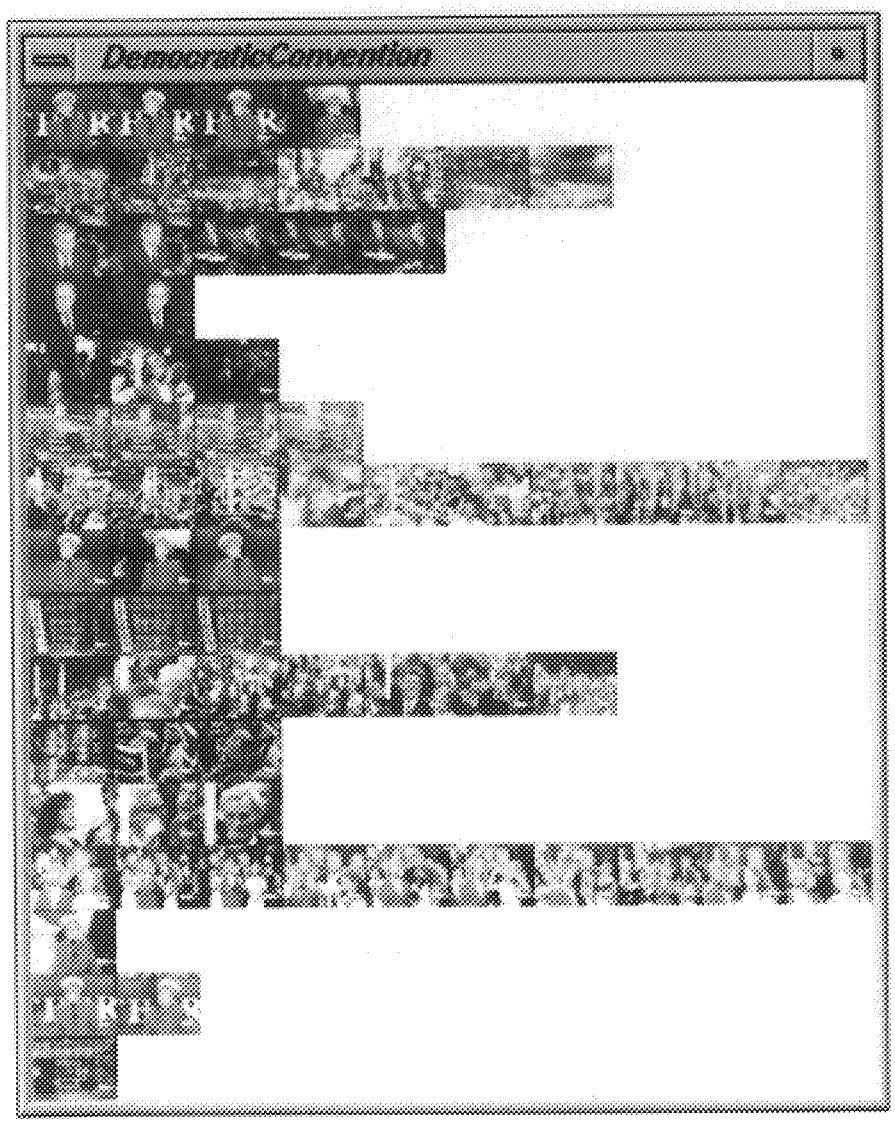
F I G. 3a

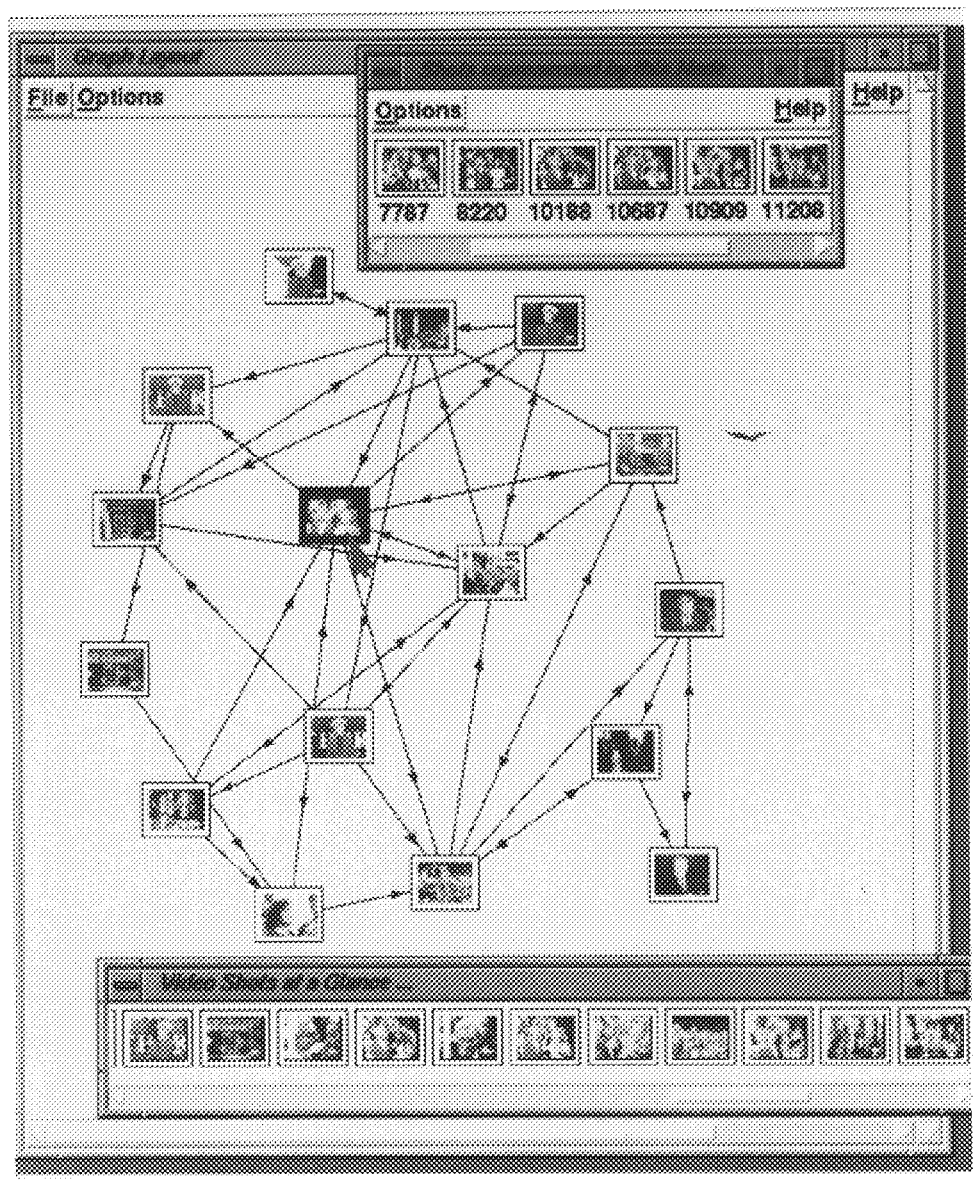
F I G. 4

METHOD AND APPARATUS FOR VIDEO BROWSING BASED ON CONTENT AND STRUCTURE

This is a continuation of application Ser. No. 08/382,877, filed Feb. 3, 1995 now U.S. Pat. No. 5,708,767.

FIELD OF THE INVENTION

The present invention relates generally to methods and apparatus for browsing of video material, and more specifically to automating the browsing process.

BACKGROUND OF THE INVENTION

The ability to browse through a large amount of video material to find the relevant clips is extremely important in many video applications. In interactive TV and pay-per-view systems, customers want to see sections of programs before renting them. While prepared trailers may suffice to publicize major motion pictures, episodic television, sports, and other programs will probably require browsers to let the customer find the program of interest. In the scholarly domain, digital libraries will collect and disseminate moving image material. Many scholars, including political scientists, psychologists and historians study moving images as primary source material. They require browsers to help them find the material of interest and to analyze the material. Browsing is even more important for video than for text-based libraries because certain aspects of video are hard to synopsize.

Early browsers were developed for video production and as front ends for video databases. Today's standard technique for browsing is storyboard browsing in which the video information is condensed into meaningful snapshots representing shots while significant portions of the audio can be heard. One known browser divides the sequence into equal length segments and denotes the first frame of each segment as its key frame. This browser does not detect scene transitions and it may both miss important information or display repetitive frames. Another known browser stacks every frame of the sequence and provides the user with rich information regarding the camera and object motions. However, a scholar using a digital video library or a customer of a pay-per-view system is more interested in the contents (who, what, where) than how the camera was used during the recording.

A first step toward content-based browsing is to classify a long video sequence into story units, based on its content. Scene change detection (also called temporal segmentation of video) gives sufficient indication of when a new shot starts and ends. Scene change detection algorithms, an algorithm to detect scene transitions using the DCT coefficients of an encoded image, and algorithms to identify both abrupt and gradual scene transitions using the DC coefficients of an encoded video sequence are known in the art.

Beyond temporal segmentation of video, one known browser uses Rframes (representative frames) to organize the visual contents of the video clips. Rframes may be grouped according to various criteria to aid the user in identifying the desired material: the user can select a key frame, and the system then uses various criteria to search for similar key frames and present them to the user as a group. The user could search representative frames from the groups, rather than the complete set of key frames, to identify scenes of interest. It is known to use a language-based model to match the incoming video sequence with the expected grammatical elements of a news broadcast, and to use a priori models of the expected content of the video clip to parse the clip.

In reality, many moving image documents have story structures which are reflected in the visual content. Note that a complete moving image document is referred to herein as a video clip. The fundamental unit of the production of video is the shot, which captures continuous action. A scene is usually composed of a small number of interrelated shots that are unified by location or dramatic incident. Feature films are typically divided into three acts, each of which consists of about a half-dozen scenes. The act-scene-shot decomposition forms a hierarchy for understanding the story. News footage also has a similar structure: a news program is divided into stories, each of which typically starts with a common visual cue signaling the start of a new story, and with each story containing several shots and perhaps multiple scenes. Thus, at the lower levels of the hierarchy, a scene may consist of alternating shots of the two main characters or an interviewer and interviewee. At the higher levels of abstraction, an act in a movie or a story in a news show may be signaled by a visual motif, such as an establishing shot of the locale or a shot of the anchor in front of a title card.

In view of such underlying structures, a video browser should allow the user to first identify the scenes taking place at that location using visual information, select the scene desired using temporal information, and similarly navigate through the various shots in the scene using both visual and temporal information. Thus there is a real need to identify both visual and temporal relationships to allow the user to recognize the underlying story structure and navigate to the desired point in the video.

SUMMARY OF THE INVENTION

In one embodiment of the invention, the story structure is modeled with a hierarchical scene transition graph, and the scenic structure is extracted using visual and temporal information with no a priori knowledge of the content—the structure is discovered automatically. A hierarchical scene transition graph reflects the decomposition of the video into acts, scenes and shots. Such a hierarchical view of the video provides an effective means for browsing the video content, since long sequences of related shots can be telescoped into a small number of key frames which represent the repeatedly appearing shots in the scene. In addition, the analysis and processing of video is carried out directly on videos compressed using common compression standards such as Motion JPEG and MPEG.

The present inventive system presents the content-structure of the video in a way that appeals to basic human understanding of the visual material in video. Also, a framework is provided on which the navigation in video databases can be facilitated both by machine automation and user interaction.

BRIEF DESCRIPTION OF THE DRAWINGS

Various embodiments of the invention are described and illustrated herein with reference to the accompanying drawings, in which like items are identified by the same reference designation, wherein:

FIG. 2 shows video shots of the 1992 Democratic Convention in a sequence based upon temporal order;

FIG. 3a shows clustering results from video shots of the 1992 Democratic Convention for one embodiment of the invention;

FIG. 4 shows an initial scene transition graph of the 1992 Democratic Convention video sequence, from an embodiment of the invention;

DETAILED DESCRIPTION OF THE INVENTION

Scene Transition Graphs and Video Browsing

Figure 1:
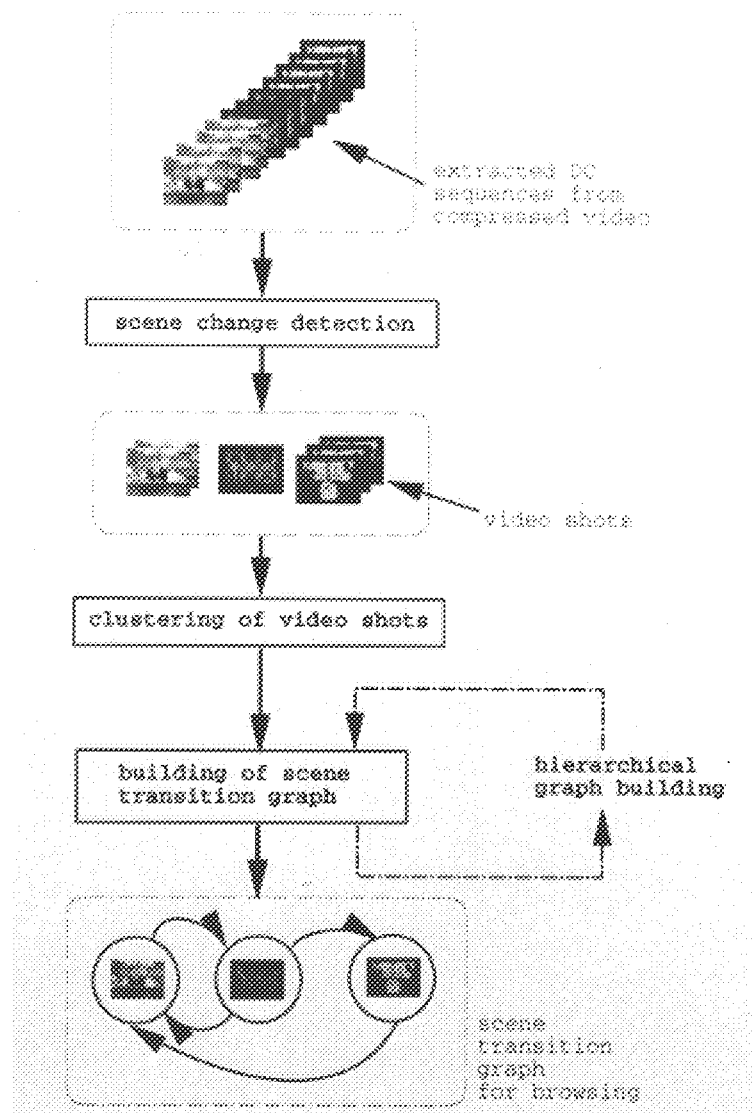
FIG. 1 is a block diagram and flowchart for one embodiment of the invention.

This section first defines the general model of hierarchical scene transition graphs, presents the notations and definitions of the terms used herein, and finally provides examples that the model represents.

Notation and definitions

A shot is defined as a continuous sequence of actions, as a fundamental unit in a video sequence. The ith shot is denoted by:

$$s_i = \{f_{bi}, \ldots, f_{ei}\} \quad (1)$$

where $f_j$ is the jth frame and $b_i$ is the beginning time of the shot and $e_i$ is the ending time of the shot. The relation $b_1 < e_1 < b_2 < e_2 < b_3 < \ldots$ is also assumed. In addition, we call a collection of one or more interrelated shots a scene. Many criteria can be imposed to determine if the shots are related or not.

A Hierarchical Scene Transition Graph (HSTG) on $\{s_i\}$ is a collection of directed graphs $$\{G_i\}_{i=0}^{H-1}$$

with H denoting the total number of levels in the hierarchy, which has the following properties:

$$G_0 = (V_0, E_0, F_0) \quad (2)$$

where $V_0 = \{V_{0,i}\}$ is the node set and $E_0$ is the edge set. $F_0$ is a mapping that partitions $\{s_i\}$ into $V_{0,1}, V_{0,2}, \ldots$, the members of $V_0$. For given U, W, in $V_0$, (U,W) is a member of $E_0$ if there exists some $s_l$ in U and and $s_m$ in W such that m=l+1.
For i=1,2, . . . , H−1:

$$G_i = (V_i, E_i, F_i). \quad (3)$$

Each $V_i$ and $E_i$ is the node set and edge set respectively. $F_i$ partitions $V_{i-1}$ into $V_{i,1}, V_{i,2}, \ldots$, the members of $V_i$. For given U, W, in $V_i$, (U,W) is a member of $E_i$ if there exists some $v_l$ in U and and $v_m$ in W such that $(v_l, v_m,)$ is a member of $E_{i-1}$.
The hierarchy is uniquely defined by the action of $\{F_i\}$ on the collections of shots $\{s_i\}$.

Property (2) deals with grouping of shots at the lowest level of hierarchy. The collection f shots is partitioned into nodes of $G_0$; each node represents a cluster of shots, which are considered a scene in the general sense. A directed edge is drawn from node U to W if there is a shot represented by node U that immediately precedes some shot represented by node W. Further grouping into other levels of the hierarchy is defined in a similar fashion in property (3). The edge relationships induced by temporal precedence at level 0 is preserved as one moves up the hierarchy.

EXAMPLES

Example 1

Tree Representation of Shots $$F_0 \text{ partitions } \{s_i\} \text{ into } V_{0,1} = \{s_1, \ldots, s_L\}, V_{0,2} = \{s_{L+1}, \ldots, s_{2L}\}, \ldots, \quad (4)$$

$$_1\text{partitions } \{V_{0,i}\} \text{ into } V_{1,1} = \{V_{0,1}, \ldots, V_{0,L}\}, V_{1,2} = \{V_{0,L+1}, \ldots, V_{0,2L}\} \ldots, \text{ and so on.} \quad (5)$$

This is a hierarchical organization in time of the collection of shots. At the lowest level, each node $V_{0,i}$ represents L shots; a directed edge connects $V_{0,i}$ to $V_{0,i+1}$, giving a directed path as the structure of the graph at this level. At the next level, each node $V_{1,i}$ represents L nodes of $G_0$. Such a tree hierarchy permits a user to have a coarse-to-fine view of the entire video sequences.

The temporal relation defined by the edge in this example is very simple. The relations between shots in a video tends to be more complicated. The next example defined $\{F_i\}$ to allow a better representation of content-based dependency between the shots.

Example 2

Directed graph representation of shots

There is one level of hierarchy, i.e. H=1. $F_0$ partitions $\{s_i\}$ into $V_{0,1}, V_{0,2}, \ldots$, such that nodes in each $V_{0,i}$ are sufficiently similar, according to some similarity measured in terms of low level vision indices such as colors, shapes, etc.

In this case, shots that are similar to each other are clustered together. Relations between clusters are governed by temporal ordering of shots within the two clusters. A simple example would be a scene of conversation between two persons; the camera alternates between shots of each person. The graph $G_0$ consists of two nodes $V_{0,1}$ and $V_{0,2}$; $(V_{0,1}, V_{0,2})$ and $(V_{0,2}, V_{0,1})$ are both members of $E_0$.

It should be noted that many implementations can fit in this model. One possible browsing system embodiment is shown below under such a generalized framework in the following sections. Extensions of this model to include more levels of the hierarchy is possible by using semantic information, derived from further processing or from human interaction, as well as temporal information.

A Method For Video Browsing For One Embodiment

A block diagram approach for one embodiment of the invention is shown in FIG. 1. The browsing process is automated to extract a hierarchical decomposition of a complex video selection in four steps: the identification of video shots, the clustering of video shots of similar visual contents, the presentation of the content and structure to the users via the scene transition graph, and finally the hierarchical organization of the graph structure.

All processing aspects of this system embodiment are performed on reduced data called DC-sequence derived directly from compressed video using Motion JPEG or MPEG. A DC-sequence is a collection of DC images, each of which is formed by blockwise averaging of an original image. In the case of a discrete cosine transform (DCT) based compression scheme, as in JPEG and I-frame of MPEG, the DC image is the collection of DC coefficients scaled by 8. The DC images in P and B frames of MPEG compressed sequences can be derived in terms of the DCT coefficients of the anchor frames, thus permitting the extraction of DC sequences directly from MPEG sequences. No full frame decompression is necessary. This approach has the advantage of computational efficiency because only a very small percentage of the entire video sequence is used. In addition, the use of DC sequence for processing permits a uniform framework for scene and content analysis on Motion JPEG and MPEG compressed video embodied in the system.

The identification of video shots are achieved by scene change detection schemes which give the start and end of each shot. A detection algorithm as described by B. L. Yeo and B. Liu, in "Rapid scene analysis on compressed videos", an unpublished paper submitted to *IEEE Transactions on Circuits and Systems for Video Technology*, is used, and the Yeo and Liu paper is incorporated herein by reference in its entirety to the extent it does not conflict herewith. The algorithm handles with high accuracy both abrupt changes and special effects like gradual transitions which are common in the real-world video. The shots that exhibit visual, spatial and temporal similarities are then clustered into scenes, with each scene containing one or more shots of similar contents. Each such cluster is a basic note in the scene transition graph. From the clustering results and the temporal information associated with each shot, the system proceeds to build the graphs, with nodes representing scenes and edges representing the progress of the story from one scene to the next. The nodes capture the core contents of the video while the edges capture its structure. The browsing approach thus is based on both content and structure of a complex video selection. While the primitive attributes of the shots contribute the major clustering criteria at the initial stage of the scene transition graph construction, hierarchy of the graph permits further organization of the video for browsing purposes. At each level a different criterion is imposed. The lower levels of the hierarchy can be based upon visual cues while the upper levels allows criteria that reflect semantic information associated. This hierarchical organization offers a browsing structure that closely resembles human perception and understanding.

The present method offers a better organization of video contents than existing storyboard browsing schemes in facilitating the browsing process. In addition, no a priori models are assumed. It also allows user interaction to supplement machine automation in the course of analysis. This is very crucial in video browsing as perception and understanding of contents varies with individuals and no existing automation schemes have yet to achieve precise accuracies.

Clustering of Video Shots

The temporal segmentation process of the video clip produces a collection of shots $\{s_i\}$, arranged in a linear array fashion according to their temporal orderings, as shown in FIG. 2. Each shot is visually represented by its representative DC image. This presentation format relieves the user from the need to watch the entire video during browsing. However, a typical one hour program can produce hundreds of different shots. In such cases, presenting shots in a one dimensional image array does not offer the users an effective and efficient means to browse, navigate and search for any particular video segments. This presents a greater challenge for the user if the user has never watched the video in its entirety, and has no idea where in the time array the search should start.

A hierarchical scene transition graph offers a better organization of video contents than existing story-board browsing schemes and facilitates the browsing process. Clustering of video shots is the first step toward the building of the graph. The sequence $\{s_i\}$ is grouped into clusters, denoted by $V_{0,1}, V_{0,2}, \ldots$ by measures of similarity. Verification of the clustering results is done through user interaction. Some degree of user verification is necessary to allow flexibility and because no a priori model is assumed for the content-structure of the video under investigation.

Similarity of shots

Low level vision analyses operated on video frames achieve reasonably good results for the measurement of similarity (or dissimilarity) of different shots. Similarity measures based on image attributes such as color, spatial correlation and shape can distinguish different shots to a significant degree, even when operated on much reduced images as the DC images. Both color and simple shape information are used to measure similarity of the shots.

Color

Most of the video shots encountered everyday are shots of real scenes, real people and realistic motions. It is rare that two shots of very different contents will have very similar visual colors. Color is an effective means to distinguish different shots. Swain and Ballard in their paper "Color Indexing", *International Journal of Computer Vision*, Vol. 7, pp. 11–32, 1991, pointed out that "although geometrical cues may be the most reliable for object identity in many cases, this may not be true for routine behavior: in such behavior wherein familiar objects are interacted with repeatedly, color may be a far more efficient indexing feature." The present inventors have confirmed this, and have found that in video with underlying story structures, like news broadcasts and night shows, where familiar scenes and people appeared and interacted repeatedly, color is far more effective and superior when used to classify video shots than moment invariant.

The present system adapts the histogram intersection method from Swain and Ballard, as cited above, to measure the similarity of two images based on color histograms. A color histogram of an image is obtained by dividing a color space (e.g. RGB) into discrete image colors (called bins) and counting the number of times each discrete color appears by traversing every pixel in the image.

Given two images $f_i$ and $f_j$, and their histograms $I^i$ and $I^i$, each containing n bins, $I^i_k$ denotes the value of $I^i$ in the kth bin. The intersection of the histograms is defined to be:

$$\sum_{k=1}^{n} \min(I^i_k, I^j_k). \tag{6}$$

This gives an indication of the number of pixels that have similar colors in both images. It can be normalized to a match value between 0 and 1 by the following:

$$S(I^i, I^j) = \frac{\sum_{k=1}^{n} \min(I_k^i, I_k^j)}{\sum_{k=1}^{n} I_j^k} \quad (7)$$

The present system uses mismatch value, $D(I^i, I^j)=1-S(I^i,I^j)$ to indicate dissimilarity between the two images instead of the match value defined above.

In the present implementation, the inventors found that a 8×8×4 discretization of the RGB color space is adequate to distinguish DC images of size 40×30 pixel square.

Shape

The present system uses as another measure of similarity between two images the two-dimensional moment invariant of the luminance. However, the inventors discovered that the order of magnitudes in different moment invariant vary greatly: in many examples the ratio of first moment invariant to the third or fourth moment invariant can vary by several orders of magnitude.

By using the Euclidean distance of the respective moment invariant as a measure of dissimilarity between two images, such distance will most likely be dominated by the moment invariant with the highest order of magnitude. The purpose of using more than one moment invariant for shape matching will then be totally defeated. The present system attempts to scale the moment invariant to comparable orders of magnitudes, or to weigh different invariants by different weights, have not produced agreeable matching results. In fact, the inventors determined that clustering based on matching by Euclidean distance on the moment invariant gives inferior results in comparison to those produced using color only.

Correlation of images

The inventors discovered that measuring correlation between two small images (even the DC images) does give a very good indication of similarity (it is actually dissimilarity in the definition below) in these images. By using the sum of absolute difference, the correlation between two images, $f_m$ and $f_n$ is commonly computed by:

$$\epsilon(m,n) + \sum_{j=1}^{J} \sum_{k=1}^{K} |f_m(j,k) - f_n(j,k)|. \quad (8)$$

The correlation is known to be very sensitive to translation of objects in the images. However, when applied to the much reduced images, effects due to object translation appear to lessen to a great degree.

The inventors found that correlation measures can achieve clustering results as good as those done by color. To further reduce the storage space needed and increase the computational efficiency, the inventors devised a simple way to measure correlation using the luminance projection defined as follows. For a given image $f_m(j,k), j=1,2, \ldots, J$ and $k=1,2, \ldots, K$, the luminance projection for the lth row is:

$$P_m^r(l) = \sum_{j=1}^{J} \text{Lum}\{f_m(j,l)\}; \quad (9)$$

and luminance projection for the lth column is:

$$P_c^m(l) = \sum_{k=1}^{K} \text{Lum}\{f_m(l,k)\}; \quad (10)$$

This is an array of size K+J and does not require the J×K storage for the whole image for correlation calculation in the later stages. To test the similarity of images $f_m$ and $f_n$, the sum of absolute difference of the row and column projections is used as follows:

$$\epsilon_{lp}(m,n) = \sum_{k=1}^{K} |P_m^r(k) - P_n^r(k)| + \sum_{j=1}^{J} |P_m^c(j) - P_n^c(j)| \quad (11)$$

The performance using the luminance projections is comparable to that of using full correlation. Thus equation (11) is used to represent the measure of correlation in two images.

Temporal variations in a video shot

Since a video shot comprises many images, similarity between the shots needs to be defined beyond that of planar images. If only a representative image is chosen for a video shot, it is very likely that there are two shots which are indeed very much the same in content but are judged to be different because the representative frames chosen for these two shots are different. For example, given the following two shots: the first shot starts with a zoomed-in view of Mr.A, the camera then zooms out to include Ms.B; the second shot starts with the camera focusing on Ms.B, then it zooms out to include Mr.A. One may think theses shots are similar (this happens often in the anchor room during news broadcasts), yet if the first image from each shot is taken as the representative image, the two representative images can be drastically different depending on the similarity measures used.

In a video shot where object and camera motions are prominent, a representative image is not sufficient for the faithful analysis of the image set it represents. Yet it is very computational burdensome to include every frame in the shot for processing purposes, as much of the temporal information is redundant. It is important to balance the two goals: to preserve as much of the temporal variations as possible and to reduce the computing load needed to process many video frames in a given shot. In the present system, the inventors chose a good but nevertheless greatly reduced representative set of frames to represent a video shot. However, it should be noted that while a representative image is used to represent a shot in the presentation of the visual results, the analysis and clustering is not confined to only one such representative image.

Clustering Algorithms

A proximity matrix for the video shots are built based on the dissimilarity measures defined for color, shape and correlation for their representative image sets. Each entry of the matrix is a proximinity index. Here the inventors followed the definitions in a paper by Jain and Dubes, "Algorithms for Clustering Data", Prentice Hall, 1988, to define the proximity index on dissimilarity: A proximity index between the ith and kth patterns ($s_i$ and $s_k$) is denoted by d(i,k) and must satisfy the following three properties:

$$d(i,i)=0, \text{ for all } i \quad (12)$$

$$d(i,k)=d(k,i), \text{ for all } (i,k) \quad (13)$$

$$d(i,k) \geq 0, \text{ for all } (i,k) \quad (14)$$

For two shots $s_i$ and $s_k$, the proximity index can be D(i,k) for color, e(i,k) for correlation and U(i,k) for shape, or any combination of the three. Note that the three measures of dissimilarity are not transitive.

The proximity matrix serves as the only input to a clustering algorithm. A clustering is a type of classification imposed on a finite set of objects, whose relationship to each other is represented by the proximity matrix in which rows and columns correspond to objects.

To allow for user interaction, the inventors chose hierarchical clustering over partitional clustering (the latter gives a single partition, and the former is a sequence of nested partitional classifications). The present system algorithm first groups the pair of shots that are most similar together, and then proceeds to group other shots by their proximity values. The proximity values between clusters are updated in the process of grouping. However, any clustering algorithms that give partitions similar to human classifications based on visual characteristics of the video shots will do for this purpose. In addition, only a good (not perfect) clustering scheme can be used as the initial step to the building of scene transition graph. The present system allows users to re-classify the mismatches. Furthermore, underclassification is always preferred to overclassification to better accommodate the hierarchical scene transition graph. This means that it is preferred to have a shot left as a single cluster than to have it grouped into other clusters not in close match.

Figure 3B:
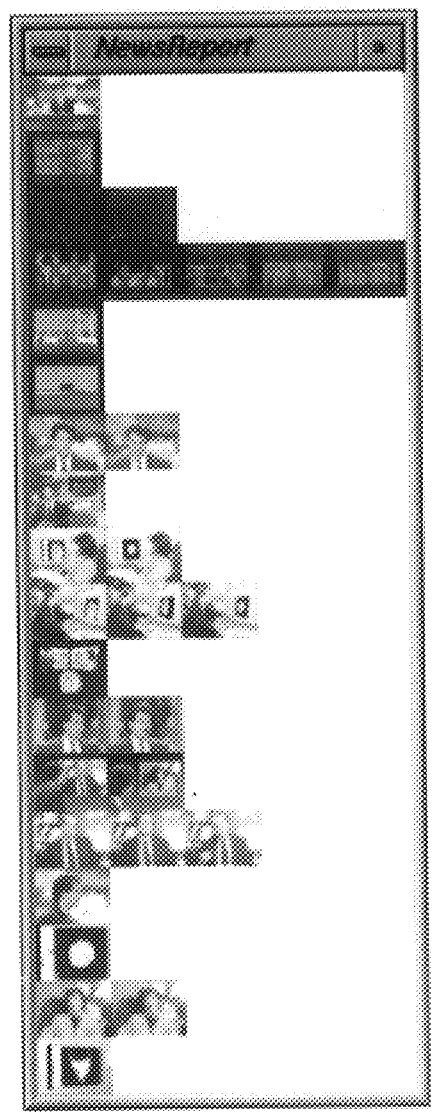
FIG. 3b shows clustering results from a News Report, for an embodiment of the invention.
Figure 5:
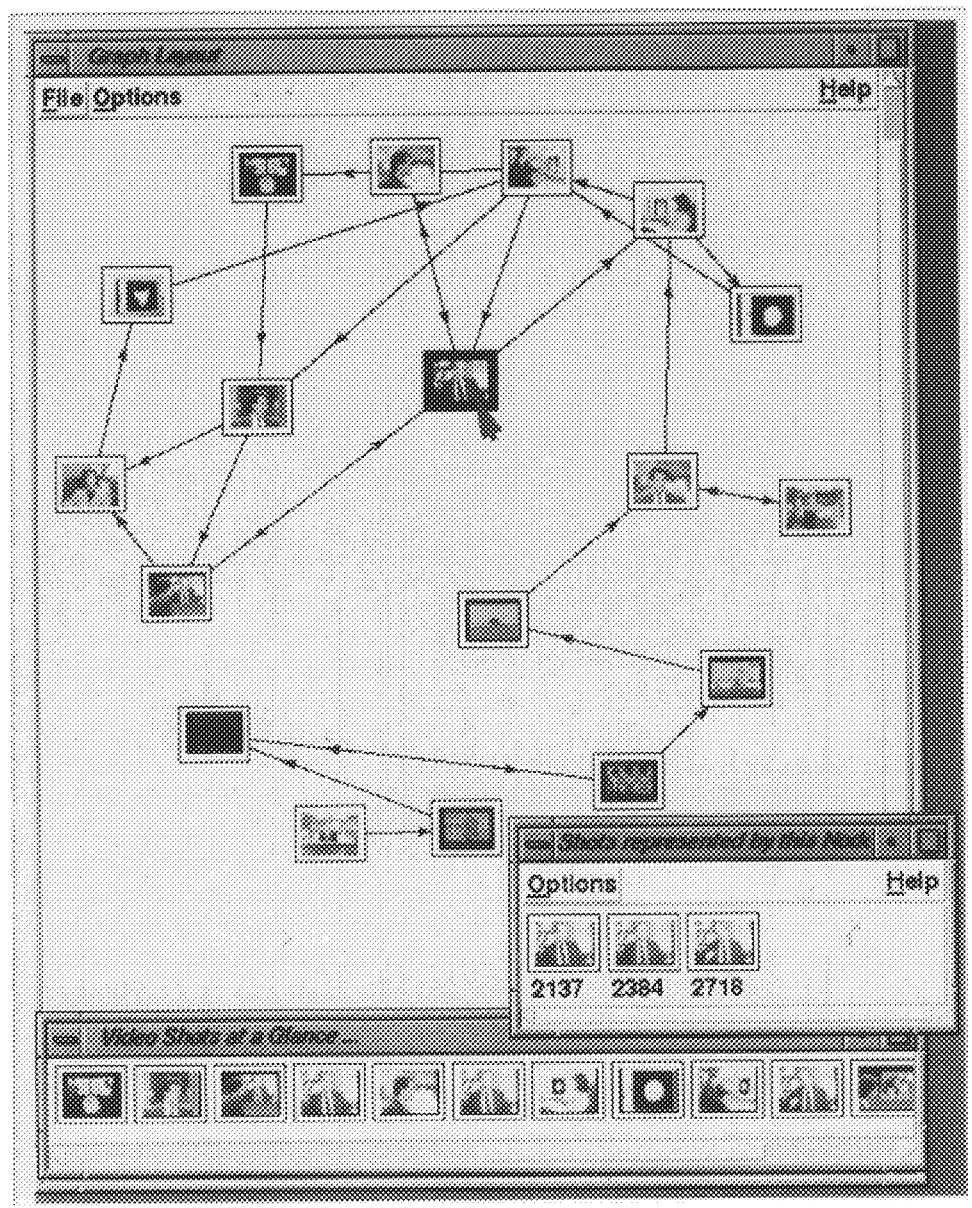
FIG. 5 shows an initial scene transition graph of the News Report sequence, for an embodiment of the invention.

The user is given the flexibility to interactively select the number of clusters desired or to set caps on the dissimilarity values between individual shots allowed in a cluster. In test trials of the present system, after the initial shot partitions, the user only needs to slightly adjust the knobs to change these partitions to yield satisfactory results, often with less than four such trials. FIGS. 3a and 3b show clustering results on two sequences: a 16-minute Democratic Convention video sequence, and a News Report, respectively. The directed scene transition graph is laid out using the algorithms disclosed by László Szirmay-Kalos, in a paper "Dynamic layout algorithm to display general graphs", in *Graphics Gems IV*, pp. 505–517, Academic Press, Boston, 1994. FIGS. 4 and 5 show the sample interface and graph layout of the two above-mentioned video sequences, based on the results in FIGS. 3a and 3b, respectively. Each node represents a collection of shots, clustered by the method described above. For simplicity, only one frame is used to represent the collection of shots. A means is also provided for the users to re-arrange the nodes, group the nodes together to form further clusters, and ungroup some shots from a cluster. This enables the user to organize the graphs differently to get a better understanding of the overall structures.

Image attributes have served as the measurement of similarity between video shots at the low levels of the scene transition graph hierarchy. In tests of the present method and system, the matching of shots based on primitive visual characteristics such as color and shape resembles the process in which the users tend to classify these video shots, when they have no prior knowledge of the video sequence given to them. However, in addition to color and shape, the users are capable of recognizing the same people (in different backgrounds, clothes, and under varying lighting conditions) in different shots, and classify these shots to be in the same cluster. Further classification and grouping is possible after the users have acquired more understanding of the video sequences.

This suggests that automatic clustering schemes for the scene transition graph building can be made at multiple levels. At each level, a different criterion is imposed. The inventors considered that vision techniques are the keys in the lower levels: image attributes contribute the clustering criterion at the bottom level, image segmentation (e.g. foregrounds and backgrounds) and object recognition can be the next level of classification. In the top levels of the hierarchy, subgraph properties and temporal structures, such as discovering repeated self-loops and subgraph isomorphism, can be explored to further condense the graph.

The scene transition graph makes use of the temporal relations to mark the edges of the directed graph. Nevertheless, this structure can also be applied to the spatial relations within an image or spatio-temporal relations within a shot. In that case, one can further enhance the hierarchy of the graph to represent an even better understanding of video and add to the machine classification capability.

Figure 6:
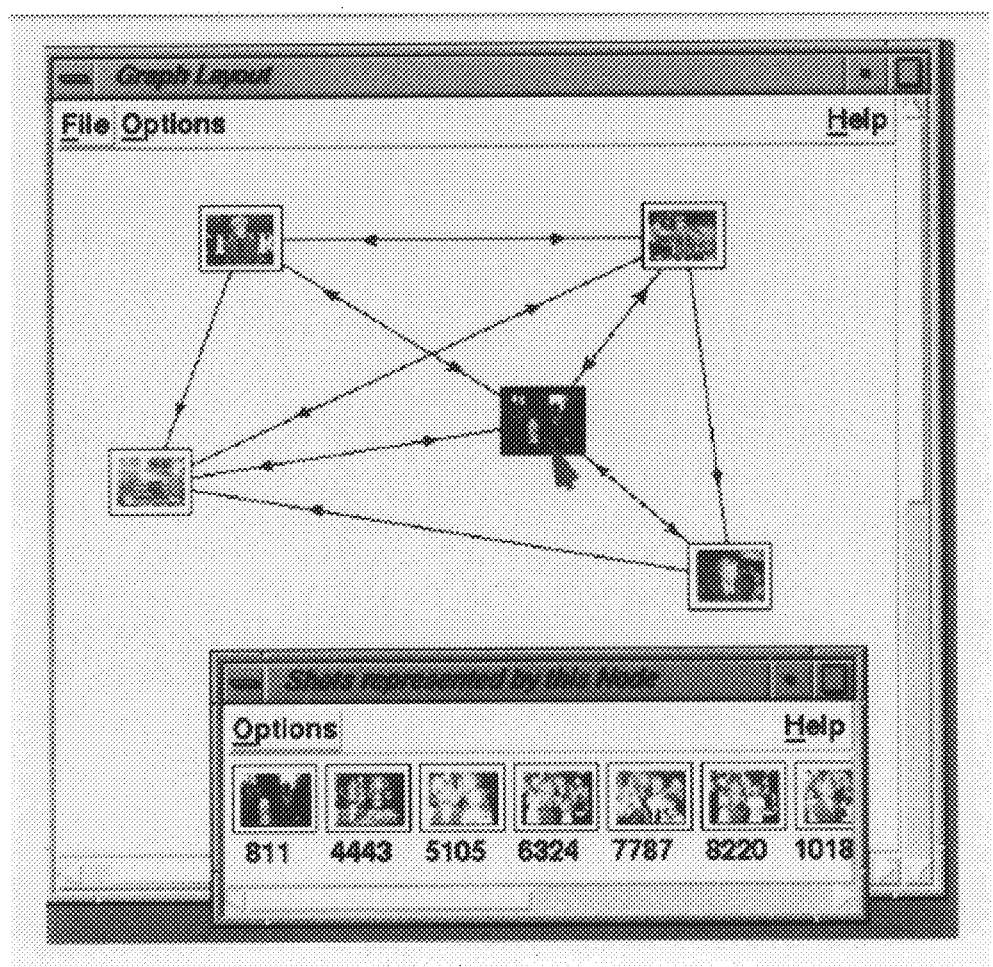
FIG. 6. shows a top-level scene transition graph of the 1992 Democratic Convention video sequence, for one embodiment of the invention.
Figure 7:
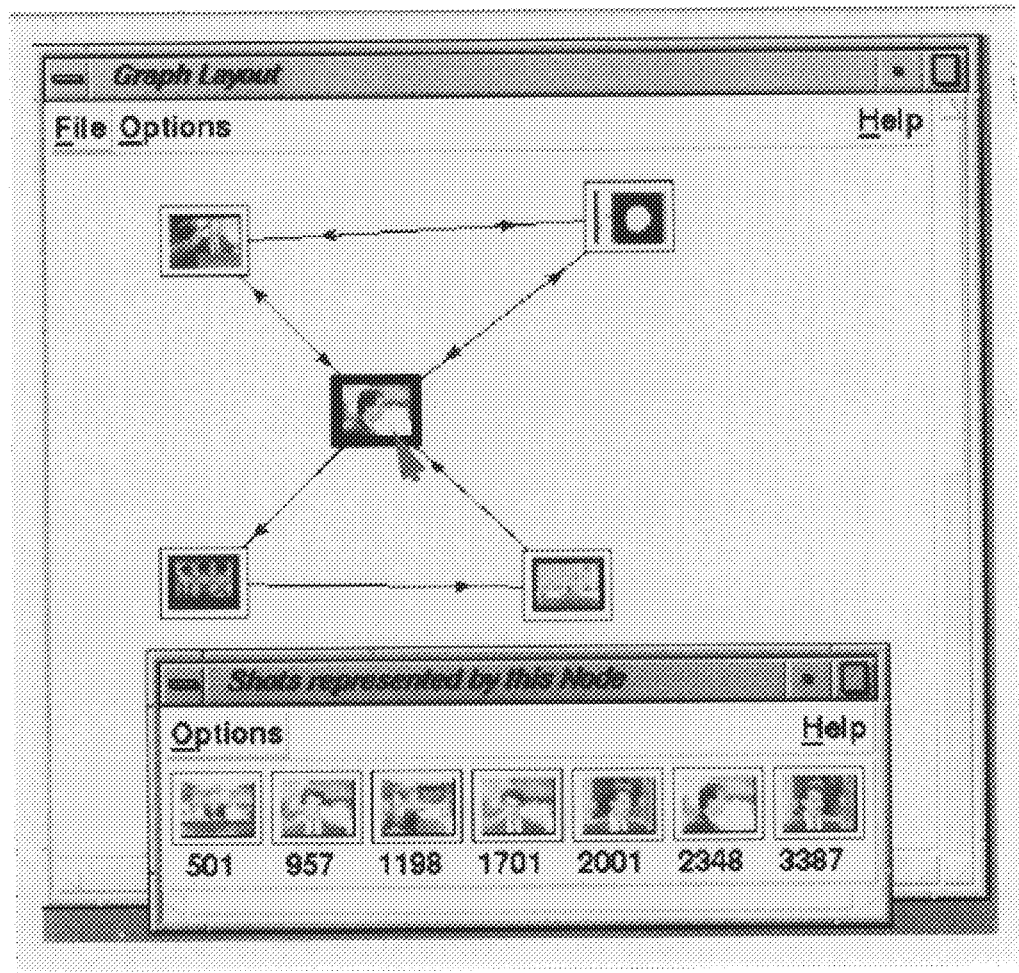
FIG. 7 shows a top-level scene transition graph of the News Report video sequence, for an embodiment of the invention.

Before all the issues are resolved and properly defined, one needs to investigate closely how the users interact with the browsing system. The present interface provides such an option for the users to group hierarchically the nodes of the graph based on their subjective criteria. At the same time, by closely monitoring what criteria they impose at different levels, and how these subjective criteria can be decomposed into more concrete entities for machine automation, the hierarchy for the graph can be improved. In FIGS. 6 and 7, potentially useful top level scene transition graphs of the respective video sequences of FIGS. 3a and 3b, respectively, are shown.

In FIG. 4, an initial scene transition graph of the 1992 Democratic Convention video sequence is shown in the central portion of the figure. A highlighted node selected by a user is illustrated in the center of the initial scene transition graph via a bold arrow and darkening of the edges of the highlighted node. The top window shows the video shots represented by the highlighted node. The bottom window in the figure shows the video shots of the scene transition graph arranged in temporal order. Similarly in FIG. 5, the upper and primary portion shows an initial scene transition graph of a News Report video sequence. A lower center window shows the video shots of the scene transition graph arranged in the temporal order. The bottom window shows the video shots associated with the highlight node.

With further reference to FIG. 6, a top-level scene transition graph of the 1992 Democratic Convention video sequence is shown. The lower window shows the contents or video shots of the highlighted node. The nodes of the scene transition graph are typically representative of complete scene changes relative to the nodes of the initial scene transition graph of FIG. 4. Similar comments apply to FIG. 7 relative to FIG. 5, for the News Report video sequence.

Figure 8:
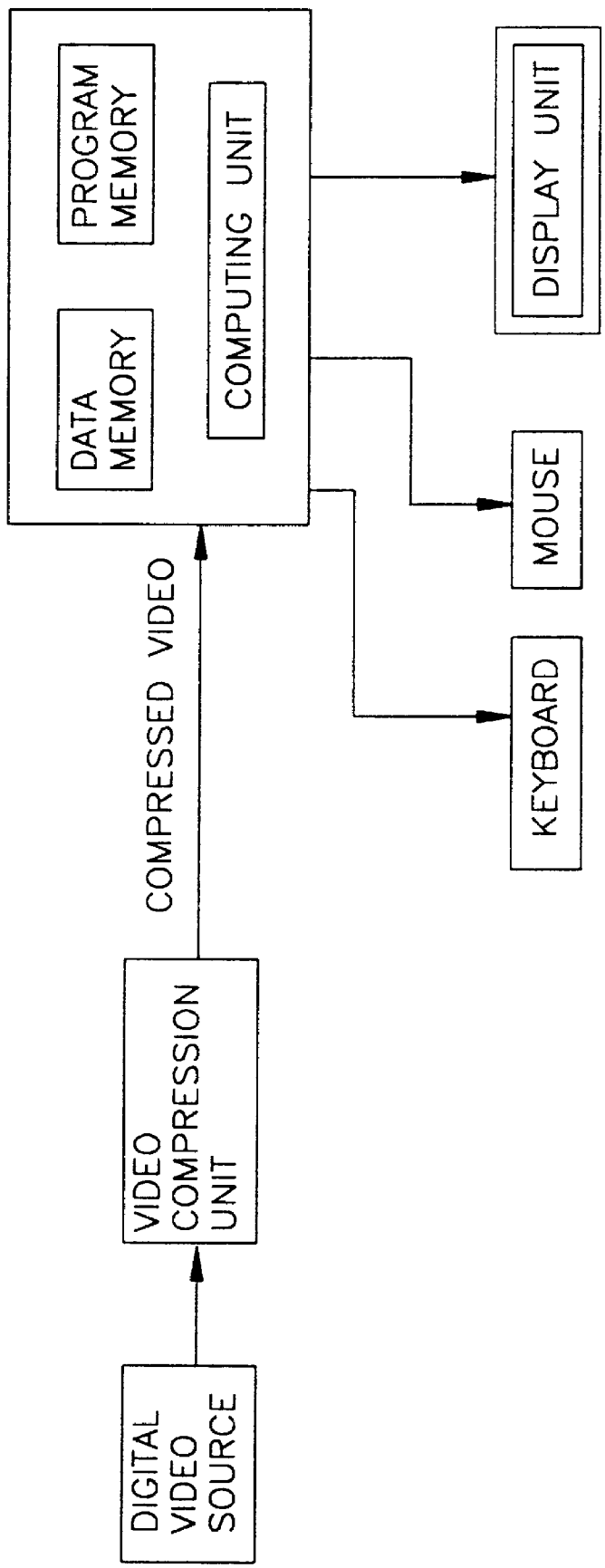
FIG. 8 shows a block schematic diagram of a system for implementing the methods of various embodiments of the invention.
Figure 9:
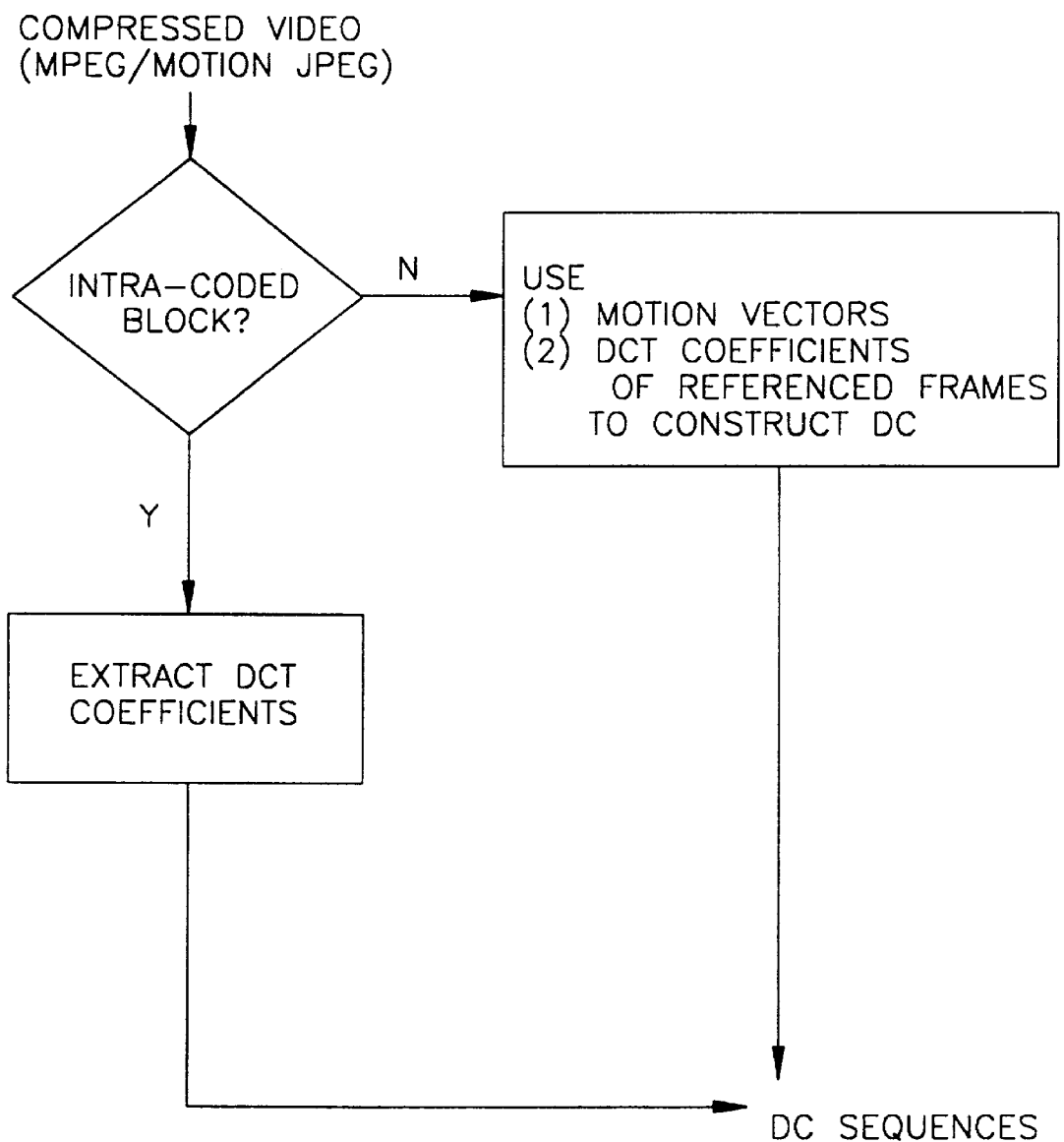
FIGS. 9, 10, 11 and 12 show flowcharts for various embodiments of the invention, respectively.
Figure 10:
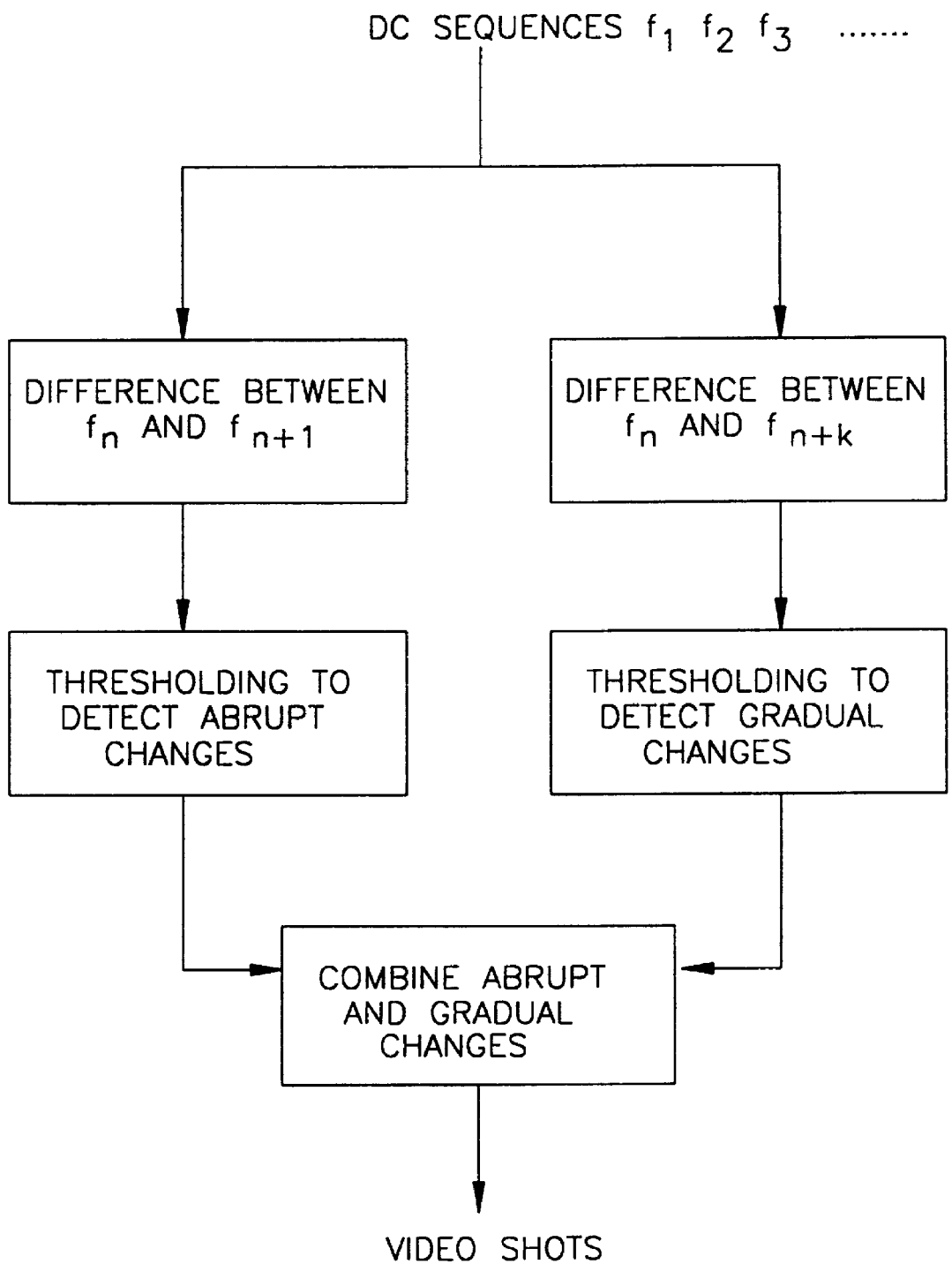
Figure 11:
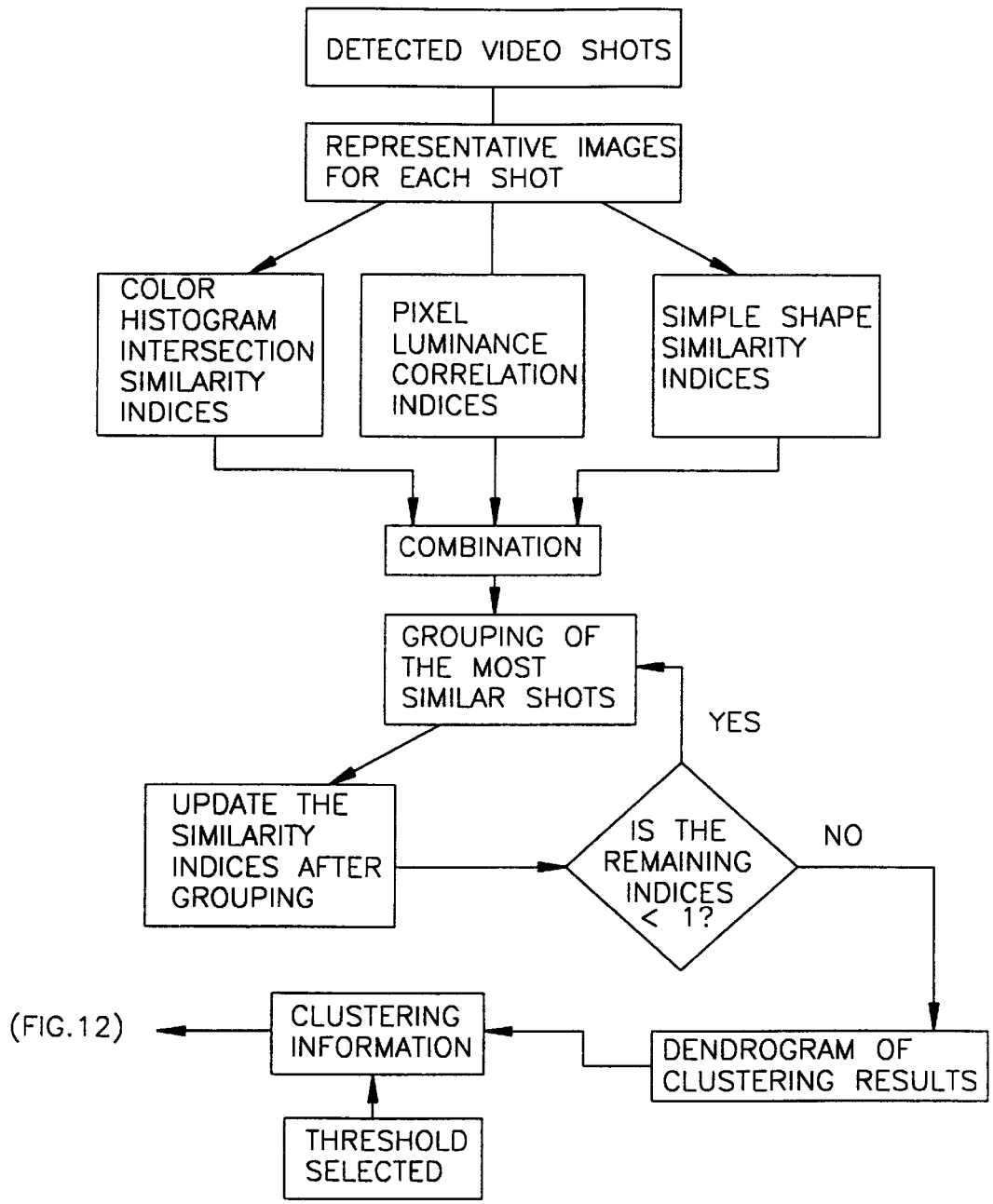
Figure 12:
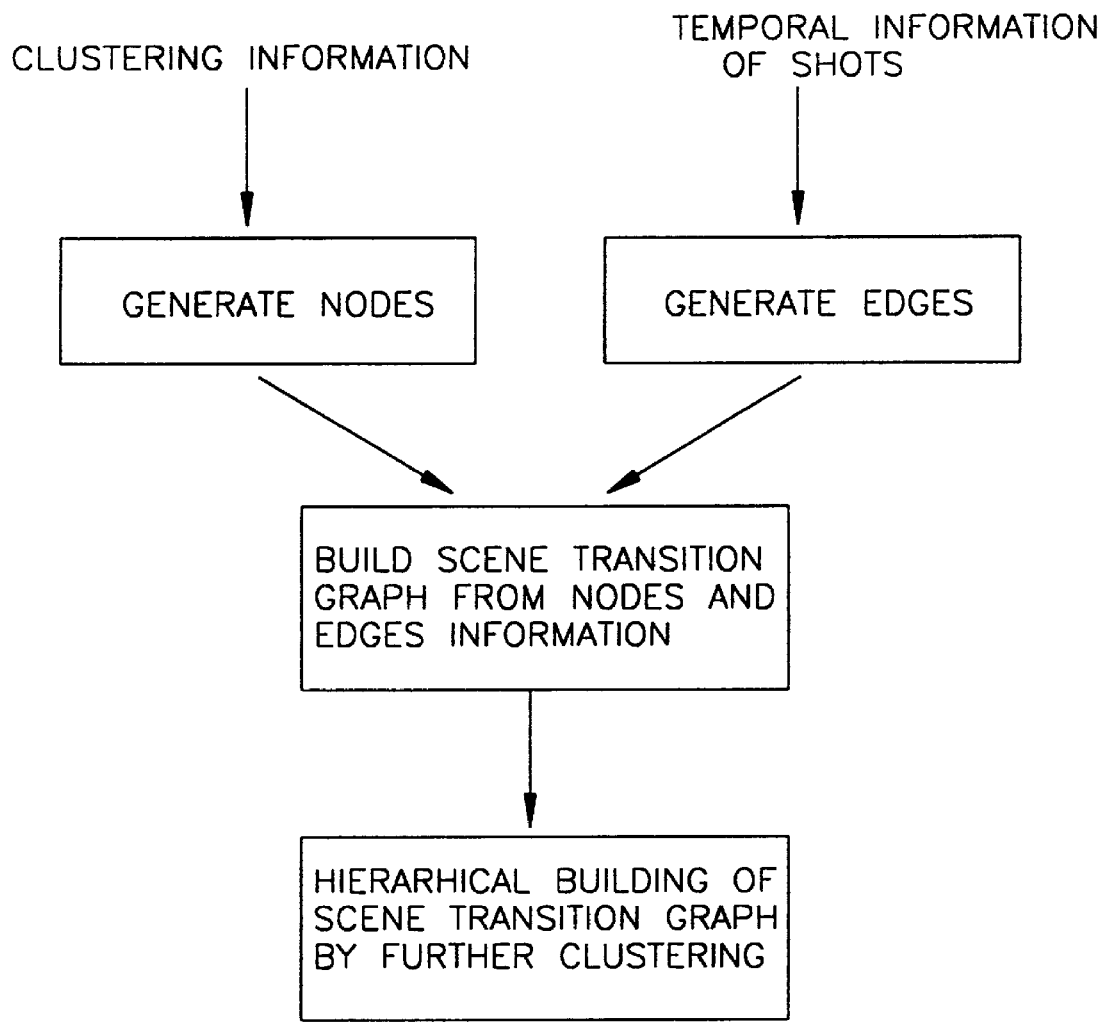

A block schematic diagram of a hardware system programmed for processing various methods of the invention is shown in FIG. 8. Flowcharts for the programming for selected ones of the steps of FIG. 1 are shown in the flowcharts of FIGS. 9, 10, 11 and 12.

Conclusions

The present method provides a general framework of hierarchical scene transition graphs for video browsing. Also presented is a new browsing method through the identification of video shots, the clustering of video shots by similarity, and the presentation of the content and structure to the users via the scene transition graph. This multi-step analysis of the video clip reveals the relationship between visual and temporal information in the clip. The combination captures the important relationships within a scene and between scenes in a video, thus allowing the analysis of the underlying story structure without any a priori knowledge.

The feasibility of this framework has been demonstrated by an implementation that automates the process of shot identification, clustering of similar shots, and construction of scene transition graph. All processing are performed on DC-sequences that are extracted directly from compressed MPEG and Motion JPEG sequences. The greatly reduced data size permits fast computation. For example, the clustering on the 16-minute Democratic Convention 1992 sequence of FIG. 3a is performed in seconds on an SGI Indy.

The scene transition graph can be further refined hierarchically. Each level has the flexibility of being constructed via different criteria to reflect both visual and semantic structure that closely resemble human perception and understanding. Thus the scene transition graph provides users with a tool for better understanding and use of complex videos.

Although various embodiments of the invention are shown and described herein, they are not meant to be limiting. Those of skill in the art may recognize certain modifications to these embodiments, which modifications are meant to be covered by the spirit and scope of the appended claims.

What is claimed is:

1. A video browser comprising:
    node defining means for defining a plurality of nodes, each of the plurality of nodes representing a collecting of video shots;
    temporal relationship defining means for defining at least one temporal relationship between at least first and second ones of the plurality of nodes; and
    a display for displaying graphical representations of the plurality of nodes and the at least one temporal relationship.

2. The video browser of claim 1, wherein the video shots of each of the plurality of nodes are interrelated by at least one of color, spatial correlation and shape.

3. The video browser of claim 1, wherein the video shots of each of the plurality of nodes are arranged in temporal order.

4. The video browser of claim. 1, wherein the graphical representation of the temporal relationship is an edge.

5. The video browser of claim 1, wherein the graphical representations of the plurality of nodes and the at least one temporal relationship are displayed as a hierarchical scene transition graph.

6. The video browser of claim 5, wherein the hierarchical scene transition graph includes a plurality of levels and wherein each of the levels can be constructed according to different criteria.

7. The video browser of claim 1, further comprising means for grouping video shots of at least two of the plurality of nodes to form an additional node.

8. The video browser of claim 1, further comprising means for ungrouping video shots from at least one of the plurality of nodes to form an additional node.

9. A method for presenting video shots for browsing, comprising the steps of:
    defining a plurality of nodes, each of the plurality of nodes representing a collection of the video shots;
    defining at least one temporal relationship between at least first and second ones of the plurality of nodes; and
    displaying graphical representations of the plurality of nodes and the at least one temporal relationship.

10. The method of claim 9, wherein the video shots of each of the plurality of nodes are interrelated by at least one of color, spatial correlation, and shape.

11. The method of claim 9, wherein the video shots of each of the plurality of nodes are arranged in temporal order.

12. The method of claim 9, wherein the graphical representation(s) of the temporal relationship is an edge.

13. The method of claim 9, wherein the graphical representations of the plurality of nodes and the at least one temporal relationship are displayed as a hierarchical scene transition graph.

14. The method of claim 13, wherein the hierarchical scene transition graph includes a plurality of levels and wherein each of the levels can be constructed according to different criteria.

15. The method of claim 9, further comprising the step of grouping video shots of at least two of the plurality of nodes to form an additional node.

16. The method of claim 9, further comprising the step of ungrouping video shots from at least one of the plurality of nodes to form an additional node.

* * * * *